United States Patent

[19]

Li

[11] Patent Number: 5,914,949
[45] Date of Patent: Jun. 22, 1999

[54] CIRCUIT AND METHOD FOR TRACKING FINGER OFF-SET IN A SPREAD-SPECTRUM RAKE RECEIVER AND WIRELESS INFRASTRUCTURE EMPLOYING THE SAME

[75] Inventor: Guang Y. Li, Hillsboro, N.J.

[73] Assignee: Lucent Technologies Inc., Murray Hill, N.J.

[21] Appl. No.: 08/769,297

[22] Filed: Dec. 17, 1996

[51] Int. Cl.[6] .................................................. H04J 13/02
[52] U.S. Cl. ................................... 370/342; 375/349
[58] Field of Search .................... 370/342, 320, 370/441, 335; 375/326, 347, 346, 200, 201, 202, 203, 204, 205, 206, 207, 208, 209, 210, 260, 259, 267, 284, 285, 299, 296, 324, 349; 455/61, 63, 65, 67.3, 504, 101, 132, 133, 134, 135, 136, 140

[56] References Cited

U.S. PATENT DOCUMENTS

| | | | |
|---|---|---|---|
| 5,361,276 | 11/1994 | Subramaniam | 375/346 |
| 5,608,722 | 3/1997 | Miller | 375/320 |
| 5,621,752 | 4/1997 | Antonio et al. | 375/347 |
| 5,691,974 | 11/1997 | Zehavi et al. | 375/326 |
| 5,737,326 | 4/1998 | I et al. | 370/342 |

*Primary Examiner*—Hug D. Vu

[57] ABSTRACT

A finger tracking circuit for a rake receiver, a method of tracking a carrier signal and a wireless infrastructure. The finger tracking circuit includes: (1) a timing error subcircuit that determines a timing error in a current power control group ("PCG") of a carrier signal to be tracked and (2) a feedback subcircuit that applies a gain signal that is a function of a data rate of the carrier signal and a signal-to-noise ratio ("SNR") to the timing error subcircuit, a convergence rate of the finger tracking circuit therefore depending on the data rate of the carrier signal.

21 Claims, 5 Drawing Sheets

CIRCUIT AND METHOD FOR TRACKING FINGER OFF-SET IN A SPREAD-SPECTRUM RAKE RECEIVER AND WIRELESS INFRASTRUCTURE EMPLOYING THE SAME

TECHNICAL FIELD OF THE INVENTION

The present invention is directed, in general, to wireless communications and, more specifically, to a circuit and method for tracking finger off-set in a spread-spectrum rake receiver and a wireless infrastructure, such as Code Division Multiple Access ("CDMA"), employing the same.

BACKGROUND OF THE INVENTION

The ever increasing availability and popularity of wireless communication can be linked to technological gains that have provided more efficient, reliable and cost-effective mobile devices, such as wireless digital telephones and personal communication systems ("PCSs"), as examples. Due to their mobility and low power requirements, conventional mobile devices impose significant design constraints upon the wireless communication networks and, more particularly, the switching offices that support them.

Each switching office is associated with multiple transceiver sites, or "cells," that enable communication between the mobile devices and the switching office. Typically, there is a high density, or closeness, of cells per geographic area, often in a honeycomb pattern of overlapping cells of communication. Cell density causes each mobile device to always be "close" to at least one cell. Thus, any wireless signal may be concurrently heard by several cells and, possibly, several switching offices. Each cell generally covers a range of several miles in each direction, which may of course be limited by natural or man made objects—mountains, buildings, etc.

In the past, wireless communication was largely analog-based, but in recent years, the wireless carriers have moved toward digital-based communications. This transition stems from compatibility and frequency utilization perspectives—if users can share a frequency or a range of frequencies, then more users can be accommodated on less bandwidth.

An increasingly popular wireless digital communication methodology is Code Division Multiple Access ("CDMA"). CDMA is a version of "older" spread spectrum technologies. Spread spectrum technology, introduced in the 1920s, has evolved over a number of decades from uses in secured military applications to conventional civilian wireless communication applications.

More particularly, spread spectrum technology provides a means for organizing radio frequency energy over a somewhat wide range of frequencies and moving among the frequency range on a time divided basis. As an example, a transmitter transmits at a first frequency at a first time and at a second frequency at a second time; a receiver receiving these transmissions is synchronized to switch frequencies during reception in response to the change from the first to the second frequency.

Whenever multiple signals are communicated through a communication network, the potential for losing data or degradation of the communication signal may increase exponentially. Maintaining a synchronized signal among a transmitter and a receiver is therefore paramount. If the synchronization, or timing, of transmission or arrival of a signal is off, then the information content of the signal may be distorted or lost—this phenomenon is commonly referred to as "slippage."

Searching for and tracking of a communication signal are therefore two of the most important synchronization processes performed by the receiver. The searching process operates to find or locate possible signal paths in order to demodulate the strongest received communication signal (as well as to provide candidates for soft handoff).

The tracking process, in contrast, operates to track a received communication signal. This is often accomplished using a "tracking loop." Conventional tracking loops work to fine-tune the signal path, most often to a static pseudo-random number ("PN") chip. Since a received signal may be transmitted at any one of a number of data rates, the lowest possible data rate is most often assumed—only a small portion of all the data received is used for the tracking process, resulting in an inefficient tracking loop.

Therefore, what is needed in the art is an adaptive means for tracking a received signal wherein a convergence rate of the tracking means is made to depend upon the data rate of the received signal. What is further needed in the art is a tracking means that follows changes in signal delay due to movement and reference timing adjustments of a mobile device.

SUMMARY OF THE INVENTION

To address the above-discussed deficiencies of the prior art, the present invention provides a finger tracking circuit for a rake receiver, a method of tracking a carrier signal and a wireless infrastructure. The finger tracking circuit includes: (1) a timing error subcircuit that determines a timing error in a current power control group ("PCG") of a carrier signal to be tracked and (2) a feedback subcircuit that applies a gain signal that is a function of a data rate of the carrier signal and a signal-to-noise ("SNR") of the carrier signal to the timing error subcircuit, a convergence rate of the finger tracking circuit therefore depending on the data rate of the carrier signal which may be suitably derived from a strength of the carrier signal.

The present invention therefore introduces the concept of adapting the gain signal applied to the timing error subcircuit as a function of the data rate and the SNR of the carrier signal. The convergence rate of the finger tracking circuit therefore is made to depend indirectly upon carrier signal strength (which usually correlates with the carrier signal's SNR): the higher the data rate of the carrier signal, the faster the convergence, and vice versa. In a most preferred embodiment, the finger tracking circuit takes the form of a phase-locked loop ("PLL") to aid continued carrier signal tracking.

In one embodiment of the present invention, the gain signal is a function of an energy content of the PCG. Energy content of the PCG depends, in part, on carrier signal amplitude, from which the data rate and the signal to noise ratio may be derived (defined). Those skilled in the art will understand that other characteristics of the carrier signal or its associated PCGs may be used to adapt the gain signal. The broad scope of the present invention is not limited to using any particular characteristic of the carrier signal to perform gain signal adaptation.

In one embodiment of the present invention, the gain signal approximates unity when the carrier signal is at a predetermined nominal energy level. In a most preferred embodiment, the gain signal is zero when either no carrier signal is present or the SNR is approaching zero—which is equivalent to switch "off." Of course, the gain signal does not need to be normalized. Certain applications may make advantageous use of non-normalized gain signals.

In one embodiment of the present invention, the feedback subcircuit comprises a loop filter coupled between prefilter and postfilter multipliers, the feedback circuit applying a gain factor derived from the amplitude to the prefilter and postfilter multipliers. Of course, the broad scope of the present invention requires neither a loop filter or multipliers. In fact, in an alternative embodiment of the present invention, the feedback subcircuit comprises a loop filter coupled between prefilter and postfilter bit shifters, the feedback circuit applying a gain factor logarithmically derived from the amplitude to the prefilter and postfilter shifters. Those skilled in the art will recognize that the present invention may be embodied in analog or digital discrete or integrated circuitry.

Alternatively, the timing error and feedback subcircuits may embodied as a sequence of instructions executable in data processing circuitry. The present invention may take the form of software executable in general purpose data processing and storage circuitry or signal processing circuitry, as appropriate. The broad scope of the present invention is not limited to a particular hardware, firmware or software embodiment.

In one embodiment of the present invention, the timing error subcircuit applies a Walsh demodulation (a Walsh index derived from the demodulation process) to the carrier signal to determine the timing error in the PCG. Those skilled in the art are familiar with Walsh demodulation. The present invention can make advantageous use of Walsh demodulation to develop the timing error that is provided to the feedback subcircuit.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. While the present invention is embodied in hardware, alternate equivalent embodiments may employ, whether in whole or in part, firmware and software. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which like numbers designate like objects, and in which.

DETAILED DESCRIPTION

Before undertaking a detailed description of a PRIOR ART finger tracking circuit (FIG. 1) and several advantageous embodiments illustrating the principles of the present invention (FIGS. 2 to 5), it may be helpful to set forth an environment within which the present invention may be associated. "Spread spectrum," as the phrase is used herein, is an umbrella term that refers generally to any modulation technique in which the data or information content of a wireless communication signal is spread over a wider bandwidth than the frequency content of the original data or information signal upon which it is based—the modulation technique operates to take an input signal and spread it over a typically broad frequency range. "Code Division Multiple Access" ("CDMA," also direct sequence ("DS")-CDMA), as the phrase is used herein, is a known wireless communication methodology based upon spread spectrum technology—major benefits of CDMA are increased capacity and efficient use of the transmission spectrum.

It should be noted that the term "include" and derivatives thereof, as used herein, mean inclusion without limitation; that the phrase "associated with" and derivatives thereof, as used herein, may mean to include within, interconnect with, contain, be contained within, connect to or with, couple to or with, be communicable with, juxtapose, cooperate with, interleave, be a property of, be bound to or with, have, have a property of, or the like; and that the term "or," as used herein, is inclusive, meaning and/or.

Figure 1:
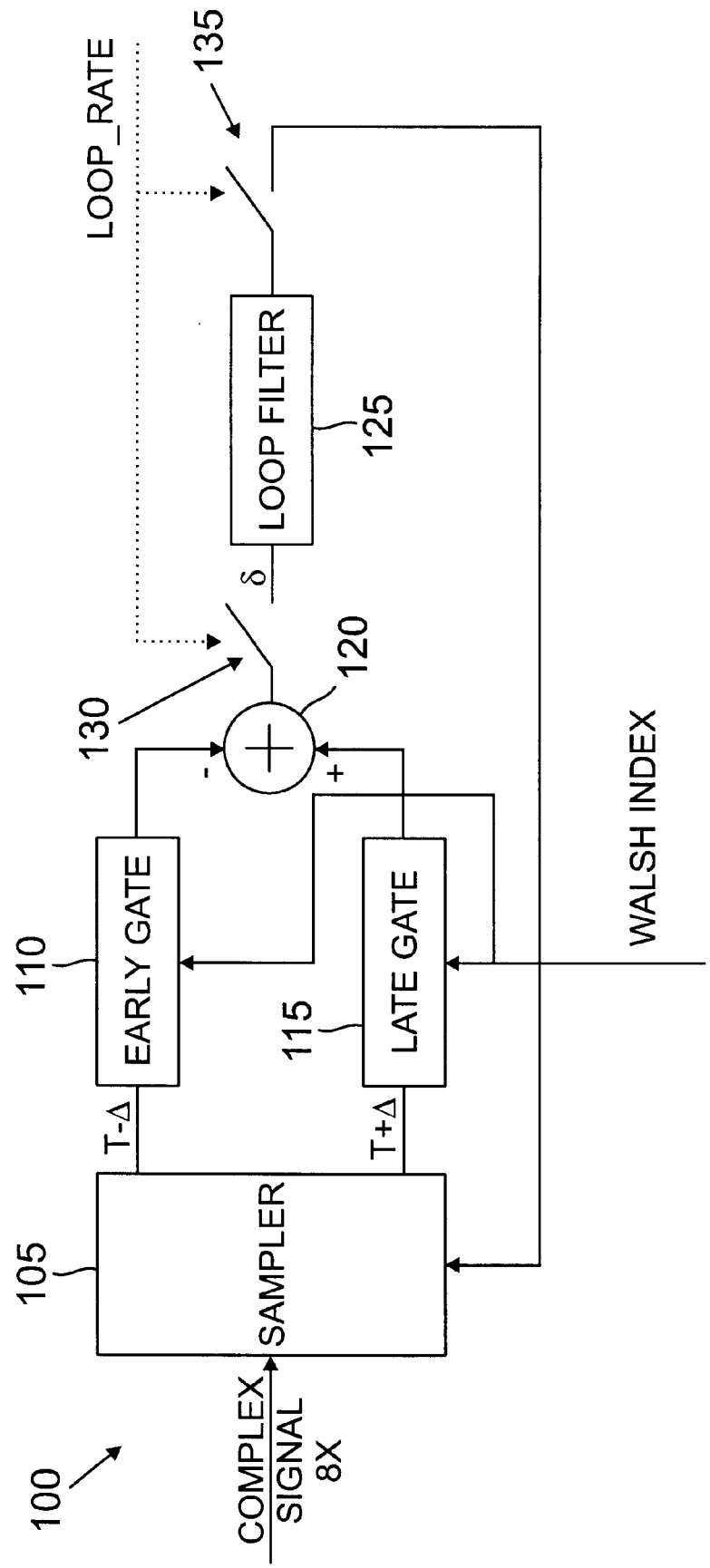
FIG. 1 illustrates a block diagram of an exemplary PRIOR ART circuit that embodies a conventional finger tracking algorithm.

Turning initially to FIG. 1, illustrated is a PRIOR ART circuit (generally designated 100) that embodies a conventional finger tracking algorithm. PRIOR ART circuit 100 may be suitably associated with a conventional rake receiver and illustratively includes each of a sampler circuit 105, an early gate circuit 110, a late gate circuit 115, an adder circuit 120, a loop filter circuit 125 and a two switching circuits 130 and 135.

Sampler circuit 105 receives a carrier signal (e.g., a complex digital communication signal) and a control signal (i.e., an output signal received from loop filter 125) as inputs and generates each of an early signal (T−Δ) and a late signal (T+Δ). Early gate circuit 110 and late gate circuit 115 respectively receive the early signal and the late signal and a control signal (e.g., a conventional Walsh Index, which may be suitably derived from a conventional demodulation process) as inputs and operate to gate the early and late signals as inputs to adder circuit 120. Adder circuit 120 combines the early and late signals to generate a timing error output signal having an amplitude that is proportional to the difference of the early and late signals' amplitudes. The timing error signal is input to loop filter circuit 125 to generate the control signal for sampler circuit 105.

Noise significantly affects performance of the above-illustrated tracking loop of PRIOR ART finger tracking circuit 100. Using CDMA as an example, noise is especially acute for conventional CDMA reverse link receiver systems (e.g., IS-95 standard), which use conventional data burst randomization ("DBR") for different data rates. If a timing error, δ, signal is gated "off" in a current power control group ("PCG"), the timing error signal may consist of nothing but noise, which may have a large magnitude.

According to PRIOR ART teachings, narrow bandwidth and small loop gains are chosen for tracking loops under "noisy" conditions to mitigate this problem. This approach effectively disables the tracking loop and results in very slow convergence. An alternate PRIOR ART approach enables the tracking loop for gated "on" PCG only. Since a carrier signal may be transmitted at any one of a plurality of data rates (e.g., 1/8, 1/4, 1/2, 1, etc. pseudorandom number ("PN") chip), a lowest data rate (e.g., 1/8 PN chip) is assumed—only two out of sixteen possible PCGs may be used for the finger tracking operation, resulting in an inefficient tracking loop.

Figure 2:
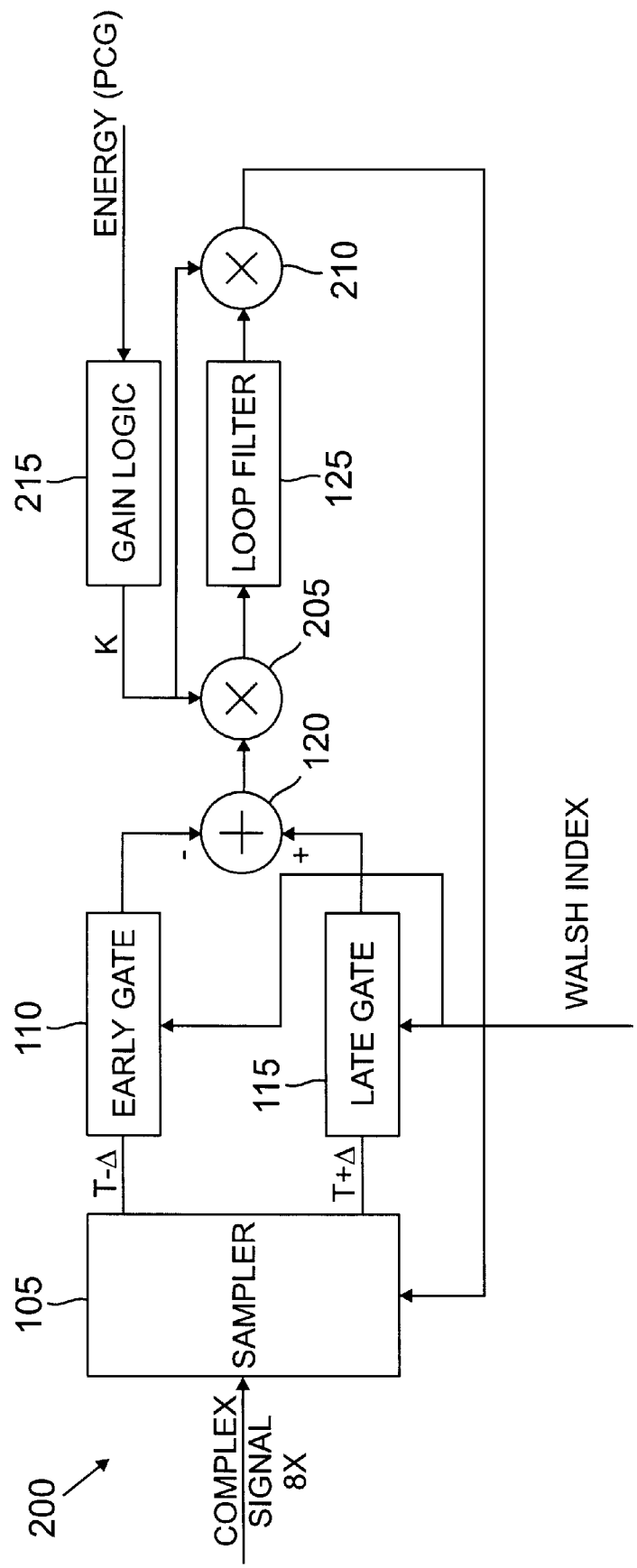
FIG. 2 illustrates a block diagram of an exemplary circuit that embodies an exemplary finger tracking algorithm of the present invention.

Turning now to FIG. 2, illustrated is a block diagram of an exemplary circuit (generally designated 200) that embodies an exemplary finger tracking algorithm of the present invention. Exemplary finger tracking circuit 200 may suitably be associated with a conventional rake receiver of a conventional wireless infrastructure (discussed with reference to FIG. 5) and illustratively includes each of a sampler circuit 105, an early gate circuit 110, a late gate circuit 115, an adder circuit 120, a loop filter circuit 125, two multiplier switching circuits 205 and 210, and a gain logic circuit 215.

Sampler circuit 105 receives a carrier signal and a control signal (i.e., an output signal received from loop filter 125) as inputs and generates each of an early signal (T−Δ) and a late signal (T+Δ). Early gate circuit 110 and late gate circuit 115 respectively receive the early signal and the late signal and a control signal (e.g., a conventional Walsh Index) as inputs and operate to gate the early and late signals as inputs to adder circuit 120. Adder circuit 120 combines the early and late signals to generate a timing error output signal having an amplitude that is again proportional to the difference of the early and late signals' amplitudes. The timing error signal is input to loop filter circuit 125 via first multiplier switching circuit 205. Loop filter circuit 125 generates the control signal and communicates the same to sampler circuit 105 via second multiplier switching circuit 210.

Exemplary sampler circuit 105, early gate circuit 110, late gate circuit 115, adder circuit 120 and first and second multiplier switching circuits 205 and 210 cooperatively comprise a timing error subcircuit that determines a timing error in a current PCG of the carrier signal being tracked.

According to the illustrated embodiment, first and second multiplier switching circuits 205 and 210 are controlled by gain logic circuitry 215. Gain logic circuitry 215 and first and second multiplier switching circuits 205 and 210 cooperatively comprise a feedback subcircuit that applies a gain signal, K, that is a function of a data rate of the carrier signal and a signal-to-noise ("SNR") of the carrier signal to the timing error subcircuit, and more particularly to sampler circuitry 105. A convergence rate of finger tracking circuit 200 depends on the data rate of the carrier signal which may be suitably derived from a strength of the carrier signal.

Since the carrier signal may be transmitted at any one of a plurality of data rates (e.g., 1/8, 1/4, 1/2, 1, etc. PN chip), the present embodiment, particularly the feedback subcircuit, operates to adapt the gain signal applied to the timing error subcircuit as a function of the data rate and the SNR of the carrier signal. The convergence rate of finger tracking circuit 200 is therefore made to depend upon carrier signal strength (which usually correlates with the carrier signal's SNR)—stronger (the higher the data rate of) the carrier signal, the faster the convergence, and vice versa. Finger tracking circuit 200 is adaptive and unlike PRIOR ART circuit 100 of FIG. 1 does not operate statically at the lowest data rate (e.g., 1/8 PN chip)—all possible PCGs may be used for the finger tracking operation of finger tracking circuit 200, resulting in an efficient tracking loop.

Alternatively, the timing error and feedback subcircuits may be embodied as a sequence of instructions executable in data processing circuitry. The present invention may take the form of software executable in general purpose data processing and storage circuitry or signal processing circuitry, as appropriate. The broad scope of the present invention may be suitably implemented in hardware, firmware, software, or suitable combinations of the same. In point of fact, any suitable processing configuration may be used, including programmable processors, programmable logic devices, such as programmable array logic ("PALs") and programmable logic arrays ("PLAs"), digital signal processors ("DSPs"), field programmable gate arrays ("FPGAs"), application specific integrated circuits ("ASICs"), large scale integrated circuits ("LSIs"), very large scale integrated circuits ("VLSIs") or the like, to form the various types of circuitry, controllers and systems described and claimed herein.

It should also be noted that finger tracking circuit 200 has illustratively taken the form of a phase-locked loop ("PLL") aiding continued carrier signal tracking.

Figure 3:
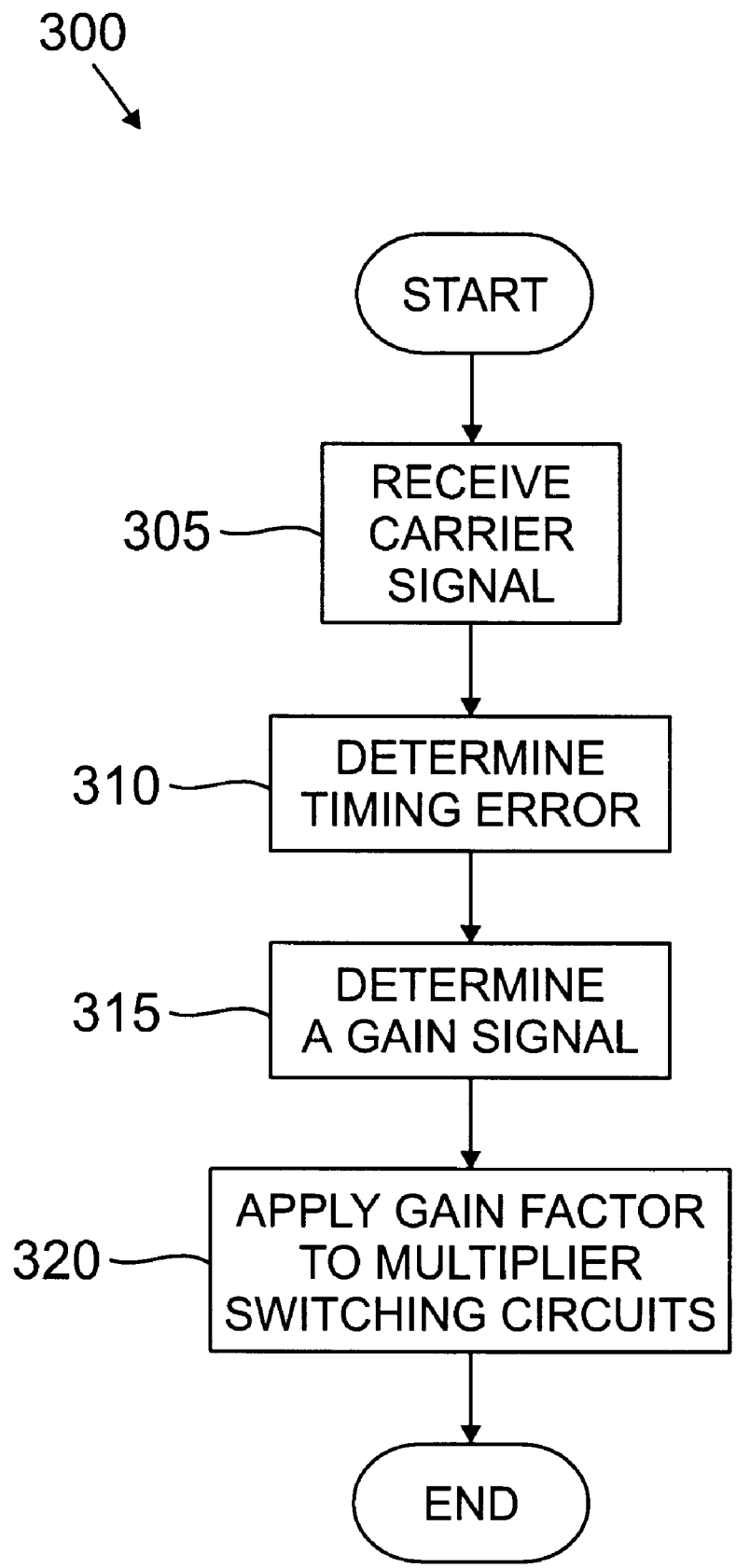
FIG. 3 illustrates a flow diagram of an exemplary finger tracking algorithm according to the principles of the present invention.

Turning now to FIG. 3, illustrated is a flow diagram of an exemplary finger tracking algorithm (generally designated 300) according to the principles of the present invention. For purposes of illustration, finger tracking algorithm 300 is discussed with reference to finger tracking circuit 200 of FIG. 2, which may be associated with a conventional rake receiver of a wireless spread spectrum infrastructure.

To begin, a carrier signal to be tracked is received by the rake receiver of a wireless spread spectrum infrastructure (input/output step 305). Finger tracking circuit 200 determines a timing error in a current PCG of the received carrier signal (process step 310). According to the illustrated embodiment, the timing error subcircuit applies a Walsh demodulation to the carrier signal to determine the timing error in the PCG. Those skilled in the art are familiar with Walsh demodulation. The present embodiment may make advantageous use of Walsh demodulation to develop the timing error that is provided to the feedback subcircuit.

Finger tracking circuit 200 determines a gain signal as a function of the energy content of the PCG of the received carrier signal (process step 315). Energy content of the PCG depends, in part, on carrier signal amplitude, which may be suitably used to determine (derive) a data rate of the carrier signal. Those skilled in the art will understand that other characteristics of the carrier signal may be used to adapt the gain signal. It should be noted that the broad scope of the present embodiment is not limited to using any particular characteristic of the carrier signal to perform gain signal adaptation.

It should also be noted that while the present embodiment illustrates the substantially concurrent performance of process steps 310 and 315, these steps may be performed sequentially and in any suitable order.

In one embodiment of the present invention, the gain signal approximates unity when the carrier signal is at a predetermined nominal energy level. In a most preferred embodiment, the gain signal is zero when either no carrier signal is present or the SNR is approaching zero—which is equivalent to switch "off." Of course, the gain signal does not need to be normalized and certain applications may make advantageous use of non-normalized gain signals.

Finger tracking circuit 200, and particularly the feedback subcircuit, comprises a gain logic circuit 215 (e.g., a loop filter) coupled between a first multiplier switching circuit 205 (e.g., a prefilter multiplier) and a second multiplier switching circuit 210 (e.g., a postfilter multiplier). The feedback circuit applies a gain factor derived from the amplitude to multiplier switching circuits 205 and 210 (process step 320), a convergence rate of finger tracking circuit 200 therefore depending on the data rate and the SNR of the carrier signal, which may be suitably derived from the strength of the carrier signal.

The broad scope of the present invention requires neither a loop filter or multipliers. In point of fact, in an alternate embodiment, the feedback subcircuit comprises a loop filter coupled between prefilter and postfilter bit shifters, the feedback circuit applying a gain factor logarithmically derived from the amplitude to the prefilter and postfilter shifters. Those skilled in the art will recognize that the present invention may be embodied in analog or digital discrete or integrated circuitry.

To summarize, exemplary finger tracking algorithm 300 adapts the gain signal applied to the timing error subcircuit as a function of the data rate and the SNR of the carrier signal. The convergence rate of finger tracking circuit 200 is therefore made to depend upon carrier signal strength (which usually correlates with the carrier signal's SNR)—the higher the data rate of the carrier signal, the faster the convergence, and vice versa.

Figure 4:
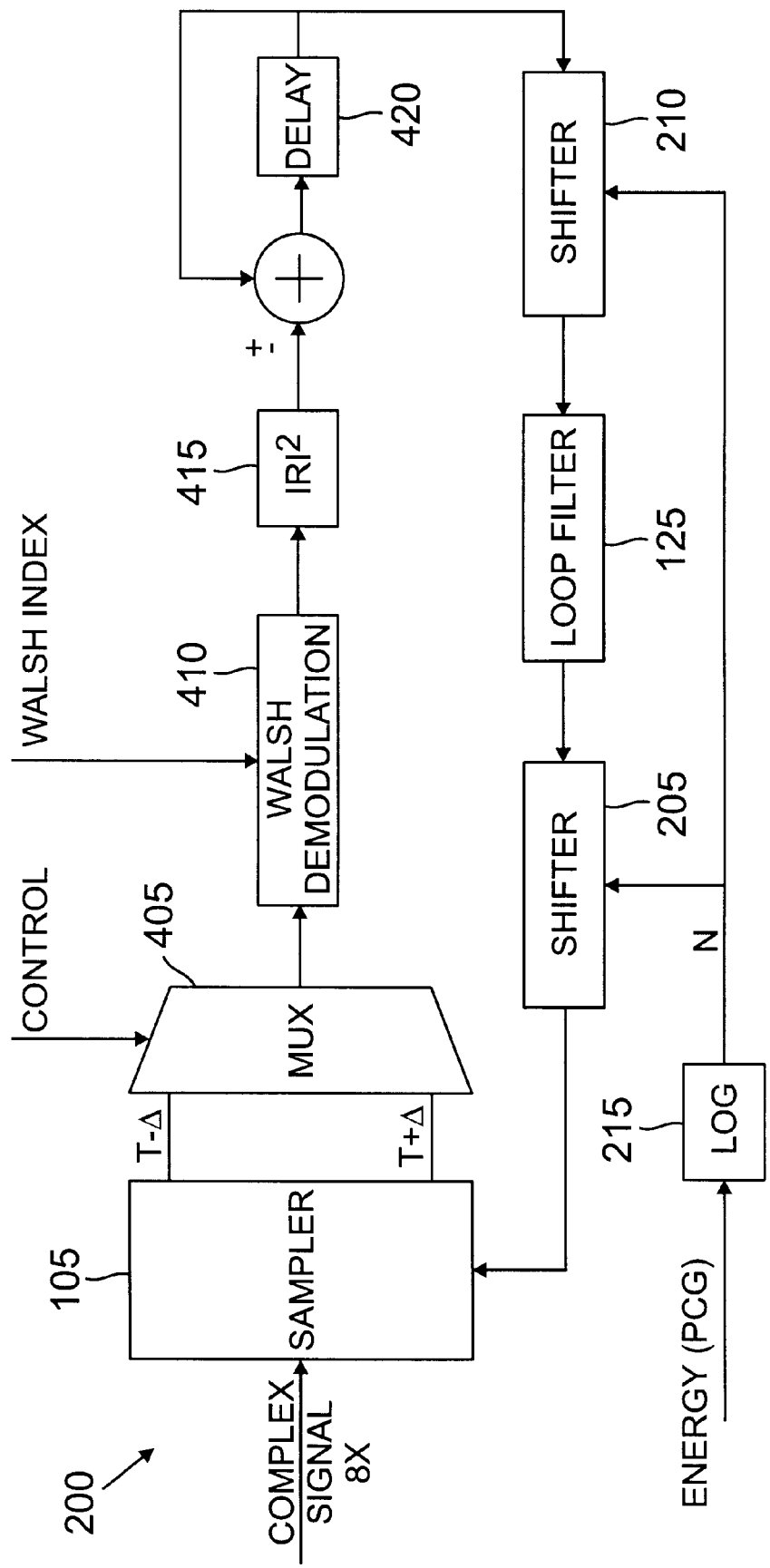
FIG. 4 illustrates a block diagram of an exemplary integrated circuit that embodies the exemplary finger tracking algorithm of FIGS. 2 and 3 according to the principles of the present invention.

Turning now to FIG. 4, illustrated is a block diagram of another exemplary circuit (again generally designated 200) that may suitably embody exemplary finger tracking algorithm 300 of FIGURE the present invention. Exemplary finger tracking circuit 200 illustratively includes each of a timing error subcircuit (e.g., a sampler circuit 105, a suitably arranged multiplexer 405, conventional Walsh demodulation circuit 410, a multiplier 415 and a suitable delay circuit 420) and a feedback subcircuit (e.g., a prefilter shifter circuit 210, a loop filter circuit 125, a postfilter shifter circuit 205 and gain logic circuit 215).

Finger tracking circuit 200 may be suitably associated with a conventional a rake receiver for tracking a carrier signal. The exemplary timing error subcircuit is operative to determine a timing error in a current PCG of a received carrier signal to be tracked. The exemplary feedback subcircuit is operative to apply a gain signal that is a function of the data rate and the SNR of the carrier signal to the timing error subcircuit, a convergence rate of finger tracking circuit 200 depending on the data rate derived from strength of the received carrier signal.

Figure 5:
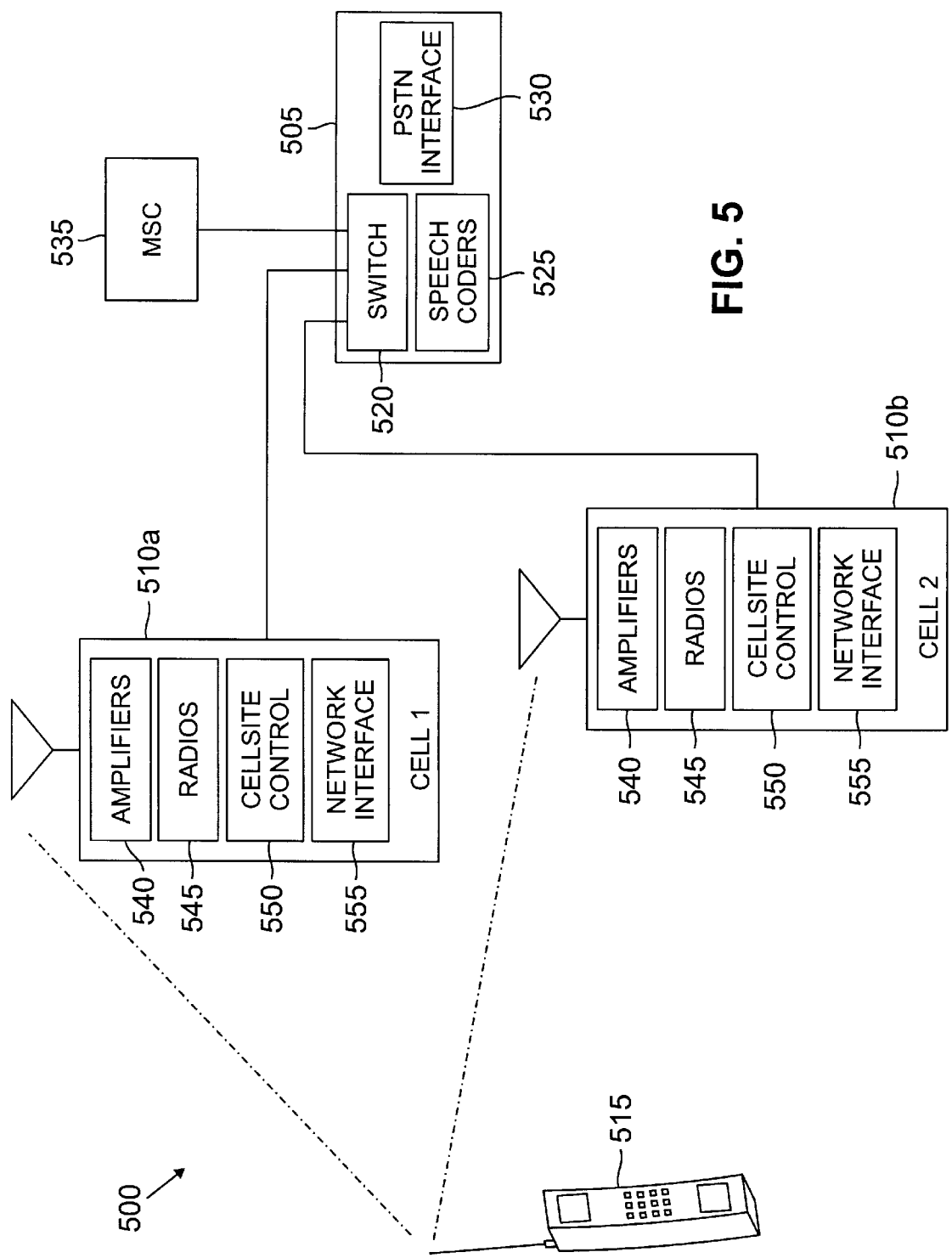
FIG. 5 illustrates a high-level block diagram of an exemplary infrastructure within which the embodiments illustrated in FIGS. 2 to 4 of the present invention may be suitably associated.

Turning now to FIG. 5, illustrated is a high-level block diagram of an exemplary infrastructure (generally designated 500) within which the embodiments of FIGS. 2 to 4 of the present invention may be suitably associated. Exemplary infrastructure 500 employs CDMA and includes a single Switching and Distribution Unit ("SDU") 505, a plurality of cells 510*a* and 510*b* employing rake receivers and a single mobile station 515.

Exemplary SDU 505 may suitably refer to any conventional base station, typically fixed, that is associated with a plurality of wireless cell sites (e.g., cells 510*a* and 510*b*) and is used by mobile units for communication with other mobile units or conventional land line communication networks (e.g., public, private) and telephony stations associated with the same.

Although the present embodiment illustrates single SDU 505 and only two cell sites, those skilled in the art understand that an infrastructure according to the principles of the present invention may include a plurality of base stations and more than two cell sites. These bases stations and cell sites typically cooperate, or communicate, via wire-based interconnections therebetween.

Exemplary SDU 505 illustratively includes a switch 520, a speech coder 525 and an interface 530. Exemplary switch 520 may be any conventional suitably arranged device operative to open or close circuits, complete or break electric paths, select circuits, select/control communication paths or the like. "Device," as the term is used herein, means any apparatus, contrivance, machine, mechanism or the like that may be implemented electrically, mechanically, electro-mechanically, electronically, optically or the like to perform at least one function or arrive at some result. Exemplary speech/voice coder 525 may be any conventional suitably arranged device operative to convert a speech/voice input received in one format to an output transmitted in another format. Exemplary interface 530 may be any conventional suitably arranged device operative to associate wireless infrastructure 500 with another base station or conventional communications network, which according to the present illustration is a public switched telephone network ("PSTN") (not shown) as an example.

Exemplary SDU 505 is illustratively associated with a Mobile Switching Center ("MSC") 535. Exemplary MSC 535 may be any conventional suitably arranged device operative to coordinate and control a plurality of cell sites, and, in particular, is responsible for processing CDMA soft-handoff requests.

Each of exemplary cells 510*a* and 510*b* is illustrative of a basic geographic unit of a wireless communication system (e.g., infrastructure 500), deriving its name largely from a geographic "honeycomb-type pattern" of cell site installations (typically, each city, county, region or the like is divide into smaller "cells"). Each of cells 510*a* and 510*b* may be any conventional suitably arranged device operable as a receiver and transmitter (e.g., a rake transceiver) of wireless carrier, or communication, signals (carrier signals not only include voice/speech signals, but may also include data signals and any associated control information). Thus, according to the illustrated embodiment, the rake transceivers, which may be suitably associated with the base stations, communicate wirelessly with at least mobile station 515 via carrier signals carried on a plurality of spread-spectrum fingers.

Each exemplary cell 510*a*, 510*b* illustratively includes amplifiers 540, radios 545, a cell site control 550 and a network interface 555. Each exemplary amplifier 540 may be any conventional suitably arranged device operative to strengthen a signal, such as a carrier signal of the present illustration—when telephone conversations travel through a medium, such as a copper wire, an optical fiber, a wireless channel or the like, they encounter resistance and thus become weaker and more difficult to receive. Each exemplary radio 545 may be any conventional suitably arranged device operative to communicate communication signals distantly by converting the same to and from electromagnetic waves broadcast wirelessly through air/space (e.g., spread spectrum). Exemplary cell site control 550 may be any conventional suitably arranged device operative to control/manage a plurality of channels within a cell, as well as to respond to control messages from MSC 535, to report statuses to MSC 535, etc. Exemplary network interface 555, similar to exemplary PSTN interface 530, may be any conventional suitably arranged device operative to associate its cell 510 with SDU 505.

According to the illustrated embodiment, a finger tracking circuit 200 of the present invention is associated with at least one of the rake transceivers. Finger tracking circuit 200 tracks at least one of carrier signal, and includes each of a timing error subcircuit and a feedback subcircuit as described with reference to FIGS. 2 to 4. The timing error subcircuit operates to determine a timing error in a current PCG of the at least one carrier signal, and the feedback subcircuit operates to apply a gain signal that is a function of a data rate and the SNR of the carrier signal to the timing error subcircuit. A convergence rate of finger tracking circuit 200 therefore depends on the data rate of the carrier signal, which may be derived from the strength of the carrier signal tracked.

Exemplary mobile station 515 is associated with each of cells 510a and 510b, and may be any conventional suitably arranged device operative to receive and transmit wireless carrier signals with cell sites. In addition to wireless telephony, such as cellular telephones, personal communication systems ("PCS") or the like, mobile station 515 may also be a wireless processing system, such as a portable computer, data terminal or the like.

Conventional data communications is more fully discussed in each of *Data Communications Principles*, by R. D. Gitlin, J. F. Hayes and S. B. Weinstein, Plenum Press (1992), in *The Irwin Handbook of Telecommunications*, by James Harry Green, Irwin Professional Publishing (2nd ed. 1992) and in *Voice & Data Communications Handbook*, by Bud Bates and Donald Gregory, McGraw-Hill (1996) ; and conventional electronic circuit and computer or processing system and network design are more fully discussed in *The Art of Electronics*, by Paul Horowitz and Winfield Hill, Cambridge (2nd ed. 1989); in *Data Network Design*, by Darren L. Spohn, McGraw-Hill, Inc. (1993); and in *Computer Organization and Architecture*, by William Stallings, MacMillan Publishing Co. (3rd ed. 1993). Each of the foregoing publications/references is incorporated herein by reference for all purposes.

From the above, it is apparent that the present invention provides a finger tracking circuit for a rake receiver, a method of tracking a carrier signal and a wireless infrastructure. The finger tracking circuit includes: (1) a timing error subcircuit that determines a timing error in a current PCG of a carrier signal to be tracked and (2) a feedback subcircuit that applies a gain signal that is a function of a data rate and the SNR of the carrier signal to the timing error subcircuit, a convergence rate of the finger tracking circuit therefore depending on the data rate of carrier signal, which may be derived from the strength of the carrier signal.

Although the present invention has been described in detail, those skilled in the art should understand that they can make various changes, substitutions and alterations herein without departing from the spirit and scope of the invention in its broadest form.

What is claimed is:

1. A finger tracking circuit for a rake receiver, comprising:
    a timing error subcircuit that determines a timing error in a current power control group (PCG) of a carrier signal to be tracked; and
    a feedback subcircuit that applies a gain signal that is a function of a data rate and a signal-to-noise ratio (SNR) of said carrier signal to said timing error subcircuit, a convergence rate of said finger tracking circuit therefore depending on said data rate of said carrier signal.

2. The finger tracking circuit as recited in claim 1 wherein said gain signal is a function of an energy content of said PCG.

3. The finger tracking circuit as recited in claim 1 wherein said gain signal approximates unity when said carrier signal is at a predetermined nominal energy level.

4. The finger tracking circuit as recited in claim 1 wherein said feedback subcircuit comprises a loop filter coupled between prefilter and postfilter multipliers, said feedback circuit applying a gain factor to said prefilter and postfilter multipliers.

5. The finger tracking circuit as recited in claim 1 wherein said timing error subcircuit applies a Walsh demodulation to said carrier signal to determine said timing error in said PCG.

6. The finger tracking circuit as recited in claim 1 wherein said feedback subcircuit comprises a loop filter coupled between prefilter and postfilter bit shifters, said feedback circuit applying a gain factor to said prefilter and postfilter shifters.

7. The finger tracking circuit as recited in claim 1 wherein said timing error and feedback subcircuits are embodied as a sequence of instructions executable in data processing circuitry.

8. A method of tracking a finger for a rake receiver, comprising the steps of:
    determining a timing error in a current power control group (PCG) of a carrier signal to be tracked; and
    applying a gain signal that is a function of a data rate and a signal-to-noise ratio (SNR) of said carrier signal to said timing error subcircuit, a rate of convergence on said carrier signal therefore depending on said data rate of said carrier signal.

9. The method as recited in claim 8 wherein said gain signal is a function of an energy content of said PCG.

10. The method as recited in claim 8 wherein said gain signal approximates unity when said carrier signal is at a predetermined nominal energy level.

11. The method as recited in claim 8 further comprising the step of applying a gain factor to prefilter and postfilter multipliers of a feedback circuit.

12. The method as recited in claim 8 wherein said step of determining comprises the step of applying a Walsh demodulation to said carrier signal.

13. The method as recited in claim 8 wherein said step of applying comprises the step of applying a gain factor to prefilter and postfilter shifters of a feedback circuit.

14. The method as recited in claim 8 wherein said method is carried out by executing a sequence of instructions in data processing circuitry.

15. A wireless Code Division Multiple Access (CDMA) infrastructure, comprising:
    a plurality of base stations that cooperate by communicating via wire-based interconnections therebetween;
    a plurality of rake transceivers, associated with said plurality of base stations, that communicate wirelessly with at least one mobile station via carrier signals carried on a plurality of spread-spectrum fingers; and
    a plurality of finger tracking circuits, associated with said plurality of rake transceivers, that track at least one of said carrier signals, each of said plurality of finger tracking circuits including:
        a timing error subcircuit that determines a timing error in a current power control group (PCG) of said at least one of said carrier signals, and
        a feedback subcircuit that applies a gain signal that is a function of a data rate and a signal-to-noise ratio of said carrier signal to said timing error subcircuit, a convergence rate of said finger tracking circuit therefore depending on said data rate of said carrier signal.

16. The wireless CDMA infrastructure as recited in claim 15 wherein said gain signal is a function of an energy content of said PCG.

17. The wireless CDMA infrastructure as recited in claim 15 wherein said gain signal approximates unity when said at least one of said carrier signals is at a predetermined nominal energy level.

18. The wireless CDMA infrastructure as recited in claim 15 wherein said feedback subcircuit comprises a loop filter coupled between prefilter and postfilter multipliers, said feedback subcircuit applying a gain factor derived from said amplitude to said prefilter and postfilter multipliers.

19. The wireless CDMA infrastructure as recited in claim 15 wherein said timing error subcircuit applies a Walsh demodulation to said at least one of said carrier signals to determine said timing error in said PCG.

20. The wireless CDMA infrastructure as recited in claim 15 wherein said feedback subcircuit comprises a loop filter coupled between prefilter and postfilter bit shifters, said feedback circuit applying a gain factor to said prefilter and postfilter shifters.

21. The wireless CDMA infrastructure as recited in claim 15 wherein said timing error and feedback subcircuits are embodied as a sequence of instructions executable in data processing circuitry.

* * * * *